(12) United States Patent
Wang

(10) Patent No.: US 11,138,700 B2
(45) Date of Patent: Oct. 5, 2021

(54) METHOD FOR IMAGE PROCESSING, NON-TRANSITORY COMPUTER READABLE MEDIUM, AND ELECTRONIC DEVICE

(71) Applicant: Guangdong OPPO Mobile Telecommunications Corp., Ltd., Guangdong (CN)

(72) Inventor: Huichao Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 150 days.

(21) Appl. No.: 16/544,251

(22) Filed: Aug. 19, 2019

(65) Prior Publication Data

US 2020/0058110 A1 Feb. 20, 2020

(30) Foreign Application Priority Data

Aug. 20, 2018 (CN) .......................... 201810948470.9

(51) Int. Cl.
 *G06T 5/00* (2006.01)
 *G06T 5/50* (2006.01)

(52) U.S. Cl.
 CPC .............. *G06T 5/009* (2013.01); *G06T 5/002* (2013.01); *G06T 5/50* (2013.01)

(58) Field of Classification Search
 CPC ........... G06T 5/009; G06T 5/002; G06T 5/50; G06T 2207/30201; G06T 5/40; G06T 5/008; H04N 9/045; H04N 9/64
 See application file for complete search history.

(56) References Cited

U.S. PATENT DOCUMENTS

| 9,857,953 B2 | 1/2018 | Sunkavalli et al. |
| 2013/0039577 A1* | 2/2013 | Chiu .................... G06K 9/4647 382/169 |
| 2017/0139572 A1* | 5/2017 | Sunkavalli .......... G06F 3/04842 |

FOREIGN PATENT DOCUMENTS

| CN | 1354950 A | 6/2002 |
| CN | 1898945 A | 1/2007 |

(Continued)

OTHER PUBLICATIONS

First Office Action from China patent office in a counterpart Chinese patent Application 201810948470.9, dated May 31, 2019 (14 pages).

(Continued)

*Primary Examiner* — Phuoc Tran
(74) *Attorney, Agent, or Firm* — Young Basile Hanlon & MacFarlane, P.C.

(57) ABSTRACT

A method for image processing, an electronic device, and a non-transitory computer readable medium are disclosed. The method includes obtaining an image in a chrominance-luminance separated color mode; traversing luminance components of all pixels in the image to determine a number of pixels corresponding to the respective luminance component; generating an original luminance distribution of the image based on the luminance components and the number of the pixels corresponding to the respective luminance component; generating a luminance mapping relationship between a preset standard luminance distribution and the original luminance distribution; and adjusting the luminance components of the pixels in the image based on the luminance mapping relationship to obtain a processed image.

18 Claims, 8 Drawing Sheets

(56) References Cited

FOREIGN PATENT DOCUMENTS

| CN | 101510305 A | 8/2009 |
|----|-------------|--------|
| CN | 101783963 A | 7/2010 |
| CN | 103617792 A | 3/2014 |
| CN | 105791790 A | 7/2016 |
| CN | 108009997 A | 5/2018 |
| CN | 108900819 A | 11/2018 |
| CN | 109272459 A | 1/2019 |

OTHER PUBLICATIONS

Notification to Grant Patent Right for Invention and Written Opinion for related Chinese application No. 201810948470.9, dated Jul. 28, 2020 (6 pages).
European Search Report and Written Opinion for related European application No. EP19192500, dated Feb. 1, 2020 (8 pages).
International Search Report and Written Opinion for related International application No. PCT/CN2019/101598, dated Nov. 19, 2019 (4 pages).
India First Examination Report for IN Application 201914033338 dated Feb. 9, 2021. (7 pages).
European Examination Report for EP Application 19192500.7 dated Apr. 1, 2021. (5 pages).

\* cited by examiner

METHOD FOR IMAGE PROCESSING, NON-TRANSITORY COMPUTER READABLE MEDIUM, AND ELECTRONIC DEVICE

CROSS-REFERENCE TO RELATED APPLICATION(S)

This application claims priority to Chinese Patent Application No. 201810948470.9, filed on Aug. 20, 2018, the content of which is herein incorporated by reference in its entirety.

TECHNICAL FIELD

The present disclosure generally relates to the technical field of electronic device, and in particular to a method for image processing, a non-transitory computer readable medium, and an electronic device.

BACKGROUND

With rapid development of electronic devices, the electronic devices such as mobile phones, tablet computers and the like all have a function of image capture, and users have higher and higher requirements for quality of the images captured by the electronic devices.

At present, after an image is captured, a brightening process may be performed for the image so that darker areas in the image may be brighter, and details, which are difficult to be distinguished by naked eyes, may be shown. Thus, definition of the whole image may be improved. However, in the above brightening process for an image, a red-green-blue (RGB) value of each pixel in the image may generally be enhanced, which may easily cause the following issues: colors in the image may be transited close to be grey, and colors in a brighter area may be distorted after the enhancement and become blurry. Image distortion may cause details in the distortion area to be lost, whereas the distortion areas of the image may usually be the areas that users focus on, for example, an area showing a face in the image.

SUMMARY

According to one aspect of the present disclosure, a method of image processing is provided. The method includes obtaining an image in a chrominance-luminance separated color mode; traversing luminance components of all pixels in the image to determine a number of pixels corresponding to the respective luminance component; generating an original luminance distribution of the image based on the luminance components and the number of the pixels corresponding to the respective luminance component; generating a luminance mapping relationship between a preset standard luminance distribution and the original luminance distribution; and adjusting the luminance components of the pixels in the image based on the luminance mapping relationship to obtain a processed image.

According to another aspect of the present disclosure, an electronic device is provided. The electronic device includes a non-transitory memory storing a computer program and a processor, wherein the processor is configured to execute the computer program to: obtain an image in a chrominance-luminance separated color mode; traverse luminance components of all pixels in the image to obtain a number of pixels corresponding to the respective luminance component and generate an original luminance distribution of the image; generate a mapping relationship between a preset standard luminance distribution and the original luminance distribution of the image, wherein the original luminance distribution includes a plurality of original luminance components, the preset standard luminance distribution includes a plurality of target luminance component, and one or more original luminance component in the original luminance distribution is mapped to one target luminance component; and adjust the one or more original luminance component mapped to the respective target luminance component to be the respective target luminance component such that a processed image is obtained.

According to yet another aspect of the present disclosure, a non-transitory computer readable medium is provided. The non-transitory computer readable medium stores instructions which, when executed by a processor, cause the processor to: obtain an image in a chrominance-luminance separated color mode; traverse luminance components of all pixels in the image to obtain a number of pixels corresponding to the respective luminance component and generate an original luminance distribution of the image; generate a mapping relationship between a preset standard luminance distribution and the original luminance distribution of the image, wherein the original luminance distribution includes a plurality of original luminance components, the preset standard luminance distribution includes a plurality of target luminance component, and one or more original luminance component in the original luminance distribution is mapped to one target luminance component; and adjust the one or more original luminance component mapped to the respective target luminance component to be the respective target luminance component such that a processed image is obtained.

DETAILED DESCRIPTION

Figure 1:
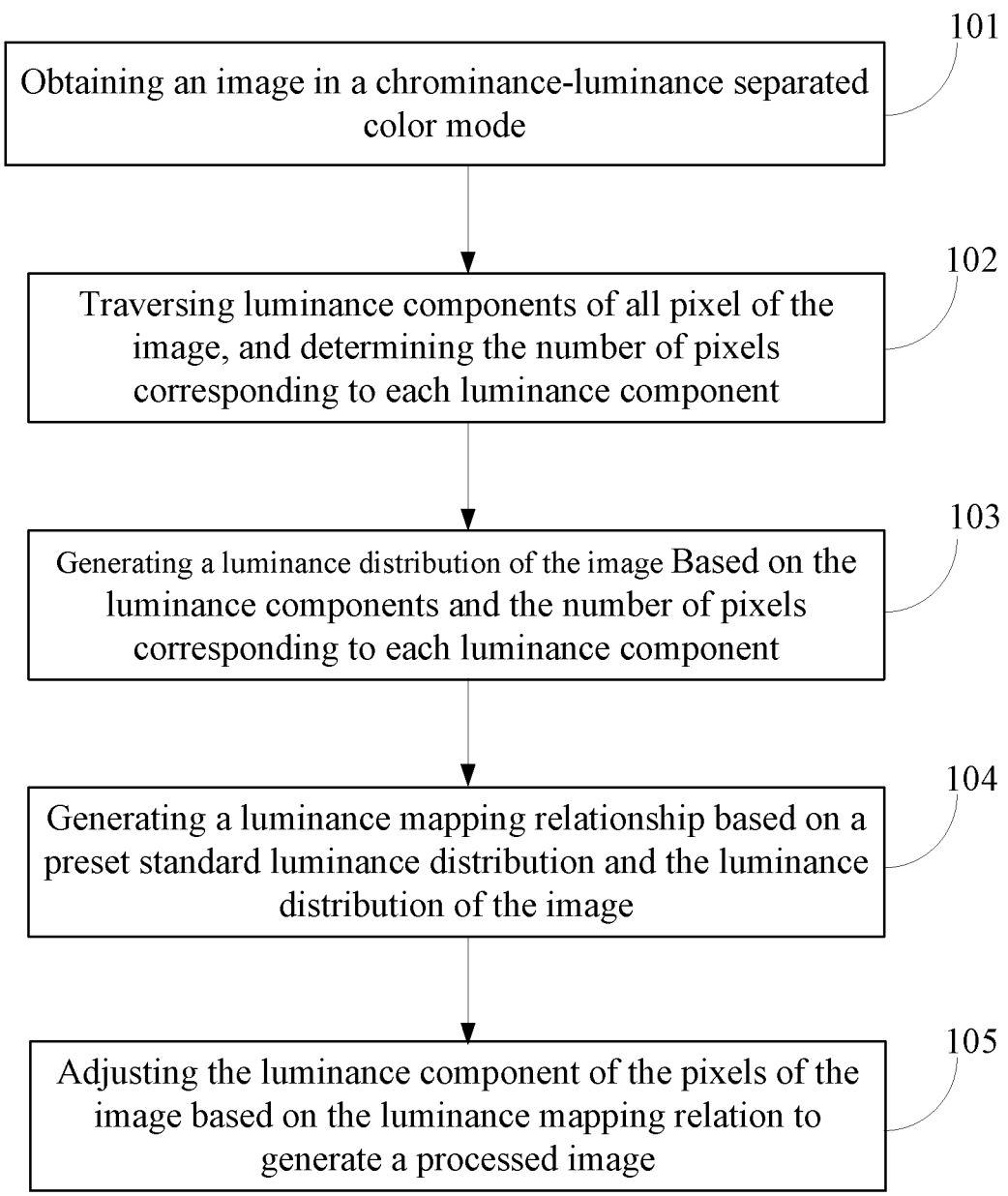
FIG. 1 is a flow chart illustrating a method for image processing provided by an embodiment of the present disclosure.

Technical solutions of the present disclosure are to be further described according to detailed implementations and appended figures. It should be understood that, the detailed embodiments described herein are for the purposes of explaining the present disclosure, but should not limit the scope of the present disclosure. In addition, it should be noted, to describe the embodiments easily, the appended figures illustrate only partial structure related to the present disclosure, but not the whole structure.

Before detailed description of exemplary embodiments, it should be noted that, some exemplary embodiments may be described to be a process or method in the form of a flow chart. Although the flow chart may describe each step as a process to be performed in order, many of the steps may be performed in parallel, concurrently or simultaneously. Further, the order of the steps may be rearranged. When an operation is completed, the process may be terminated, but may contain additional steps that are not shown in the figures. The process may relate to a method, a function, a procedure, a sub-routine, a sub-program and the like.

A method of image processing is provided. The method includes obtaining an image in a chrominance-luminance separated color mode; traversing luminance components of all pixels in the image to determine a number of pixels corresponding to the respective luminance component; generating an original luminance distribution of the image based on the luminance components and the number of the pixels corresponding to the respective luminance component; generating a luminance mapping relationship between a preset standard luminance distribution and the original luminance distribution; and adjusting the luminance components of the pixels in the image based on the luminance mapping relationship to obtain a processed image.

In one embodiment, the preset standard luminance distribution includes a plurality of first ratios, and each first ratio indicates a ratio of a number of pixels corresponding to one target luminance component to a total number of pixels in the image. The original luminance distribution of the image includes a plurality of second ratios, and each second ratio indicates a ratio of a number of pixels corresponding to one luminance component to a total number of pixels in the image. The generating the luminance mapping relationship includes determining luminance components to be adjusted in the original luminance distribution of the image and corresponding target luminance components in the preset standard luminance distribution based on the first ratios and the second ratios; and creating the luminance mapping relationship between the luminance components to be adjusted and the corresponding target luminance components.

In one embodiment, a previous luminance component in the original luminance distribution has one second ratio less than one first ratio of one corresponding target luminance component in the preset standard luminance distribution; and one or more subsequent luminance component in the original luminance distribution is determined to be adjusted such that a mapping between the corresponding target luminance component and the one or more subsequent luminance component is created, wherein the one or more subsequent luminance component is located in an interval adjacent to the previous luminance component.

In one embodiment, the one or more subsequent luminance component includes a first luminance component having one second ratio equal to or greater than a difference between the second ratio of the previous luminance component and the first ratio of the corresponding target luminance component, and the first luminance component is determined to be adjusted.

In one embodiment, the one or more subsequent luminance component includes a first luminance component and a second luminance component having one second ratio respectively, and a sum of the second ratios of the first luminance component and the second luminance component is equal to or greater than a difference between the second ratio of the previous luminance component and the first ratio of the corresponding target luminance component, and the first luminance component and the second luminance component are determined to be adjusted.

In one embodiment, the luminance components are divided into a plurality of luminance component intervals; the preset standard luminance distribution includes a plurality of third ratios, and each third ratio indicates a ratio of a number of pixels corresponding to one luminance component interval to a total number of pixels; the original luminance distribution of the image includes a plurality of fourth ratios, and each fourth ratio indicates a ratio of a number of pixels corresponding to one luminance component interval to a total number of pixels in the image. The generating the luminance mapping relationship includes: determining luminance components to be adjusted in the original luminance distribution of the image and corresponding target luminance components in the preset standard luminance distribution based on the third ratios and the fourth ratios; and creating the luminance mapping relationship between the luminance components to be adjusted and the corresponding target luminance components.

In one embodiment, a previous luminance component interval in the original luminance distribution has one fourth ratio less than one third ratio of corresponding luminance component interval in the preset standard luminance distribution; and a subsequent luminance component interval in the original luminance distribution is determined to be adjusted such that a mapping between luminance components in the subsequent luminance component interval and the corresponding target luminance component is created, wherein the subsequent luminance component interval is adjacent to the previous luminance component interval and has one fourth ratio equal to or greater than a difference between the fourth ratio of the previous luminance component interval and the third ratio of the corresponding luminance component interval.

In one embodiment, the generating the luminance mapping relationship includes: determining a range of luminance components of the image, wherein the range of luminance components of the image is a subset of a range of luminance components in the preset standard luminance distribution; obtaining target luminance distribution corresponding to the range of luminance components of the image from the preset standard luminance distribution; and generating the luminance mapping relationship between the target luminance distribution and the original luminance distribution of the image.

In one embodiment, the image includes a dark region, and luminance components of the pixels in the dark region have values smaller than a preset value; and after generating the luminance mapping relationship, the method further includes: determining a ratio of a number of pixels in the dark region of the image to a total number of pixels of the image; and adjusting the luminance mapping relationship based on the ratio of the number of pixels in the dark region to the total number of pixels of the image and the luminance components of the pixels in the dark region.

In one embodiment, the adjusting the luminance mapping relationship includes: determining an adjust value for the luminance components of the dark region based on the ratio of the number of pixels in the dark region to the total number of pixels in the image; and subtracting the adjust value from corresponding target luminance components corresponding to the luminance components in the dark region to obtain the adjusted luminance mapping relationship.

In one embodiment, the adjust value for the luminance components in the dark region is negatively correlated with the ratio of the number of pixels in the dark region to the total number of pixels in the image.

In one embodiment, the chrominance-luminance separated color mode includes a YUV color mode and a LAB color mode.

In one embodiment, the obtaining the image in the YUV color mode includes: converting raw signals captured by an image sensor into an image in the RGB color mode; and generating an image in the YUV color mode based on the image in the RGB color mode.

In one embodiment, the preset standard luminance distribution is configured for a scene mode.

An electronic device is provided. The electronic device includes a non-transitory memory storing a computer program and a processor, wherein the processor is configured to execute the computer program to: obtain an image in a chrominance-luminance separated color mode; traverse luminance components of all pixels in the image to obtain a number of pixels corresponding to the respective luminance component and generate an original luminance distribution of the image; generate a mapping relationship between a preset standard luminance distribution and the original luminance distribution of the image, wherein the original luminance distribution includes a plurality of original luminance components, the preset standard luminance distribution includes a plurality of target luminance component, and one or more original luminance component in the original luminance distribution is mapped to one target luminance component; and adjust the one or more original luminance component mapped to the respective target luminance component to be the respective target luminance component such that a processed image is obtained.

In one embodiment, the chrominance-luminance separated color mode includes YUV color mode and LAB color mode.

In one embodiment, the electronic device further includes an image sensor configured to capturing raw signals, wherein the raw signals are converted into an image in the RGB color mode, and the image in the YUV color mode is generated based on the image in the RGB color mode.

In one embodiment, the preset standard luminance distribution includes a plurality of first ratios, and each first ratio indicates a ratio of a number of pixels corresponding to one target luminance component to a total number of pixels in the image; the original luminance distribution of the image includes a plurality of second ratios, and each second ratio indicates a ratio of a number of pixels corresponding to one original luminance component to a total number of pixels in the image. The one or more original luminance component is located after a first original luminance component and is located in an interval adjacent to the first original luminance component in the original luminance distribution, wherein the first original luminance component has one second ratio less than one first ratio of one corresponding target luminance component in the preset standard luminance distribution.

In one embodiment, the one or more original luminance component includes a second original luminance component, wherein the second original luminance component has one second ratio equal to or greater than a difference between the second ratio of the second original luminance component and the first ratio of one corresponding target luminance component in the preset standard luminance distribution.

A non-transitory computer readable medium is provided. The non-transitory computer readable medium stores instructions which, when executed by a processor, cause the processor to: obtain an image in a chrominance-luminance separated color mode; traverse luminance components of all pixels in the image to obtain a number of pixels corresponding to the respective luminance component and generate an original luminance distribution of the image; generate a mapping relationship between a preset standard luminance distribution and the original luminance distribution of the image, wherein the original luminance distribution includes a plurality of original luminance components, the preset standard luminance distribution includes a plurality of target luminance component, and one or more original luminance component in the original luminance distribution is mapped to one target luminance component; and adjust the one or more original luminance component mapped to the respective target luminance component to be the respective target luminance component such that a processed image is obtained.

FIG. 1 is a flow chart illustrating a method for image processing provided by an embodiment of the present disclosure. The method may be performed by an apparatus for image processing, wherein the apparatus may be realized by software and/or hardware, and may usually be integrated in an electronic device. Referring to FIG. 1, the method may include actions/operations in the following blocks.

At block 101, the method obtains an image in a chrominance-luminance separated color mode.

To be exemplary, the electronic device in embodiments of the present disclosure may be a smart device configured with an image capture apparatus, such as a mobile phone and a tablet computer.

Colors are usually described by three independent properties, wherein three variables may function corporately to form a space coordinate system. This is called as a color mode. Color modes may include a basic color mode and a chrominance-luminance separated color mode. For example, the basic color mode includes, but not limits to, RGB color mode, and the chrominance-luminance separated color mode includes, but not limits to, YUV color mode and LAB color mode. In YUV color mode, the Y component represents luminance, the U component represents chrominance, and the V component represents saturation, wherein the U component and the V component corporately represent colors of an image. In the LAB color mode, the L component represents luminance, and A component and B component corporately represent chrominance. The luminance component and the chrominance component may be extracted separately from the image in the chrominance-luminance separated color mode, and then any one of luminance and chrominance of the image may be processed. To be exemplary, during the processing of the luminance component, the chrominance component may not be impacted.

To be noted that, the RGB color mode, the YUV color mode and the LAB color mode may be converted each other. As an example of a mobile phone, when an image is captured by an image capture apparatus within the mobile phone, a manner for generating an image in YUV color mode may include: converting raw data obtained by an image sensor into an image in the RGB color mode; and generating an image in YUV color mode based the image in RGB color mode. The image capture apparatus may be a camera, wherein the camera may include a charge-coupled device (CCD) image sensor or a complementary metal oxide semiconductor (CMOS) image sensor. Signals from a light source captured by the CCD image sensor or the CMOS image sensor may be converted into digital signals as raw data, the raw data may be converted into data of an image in the RGB color mode, and the data of the image in RGB color mode is further converted into data of the image in the YUV color mode. With the image capture apparatus of the mobile phone, an image in the joint photographic expert group (JPG) format may be formed by the image in the YUV color mode.

To be noted that, colors of the image in RGB color mode, which is converted from the raw data, may not be real colors of the image, and thus the data of the image in the RGB color mode formed herein may not be processed by any means. Colors formed in the data of the image in the YUV color mode are real colors of the image, and thus the data of the image in the YUV color mode may be processed. During common processing of an image, the RGB data may usually be processed, wherein color mode conversion, which is raw data→image in RGB color mode→image in YUV color mode, may be performed for the raw data captured by the image sensor. For an image, the image in RGB color mode may be processed to obtain the processed image in RGB color mode, and then the processed image in RGB color mode may be converted into an image in YUV color mode to obtain an image in the JPG format. Accordingly, when images in other color modes is processed, the images must be converted into the images in YUV color mode, and after converting into the images in YUV color mode, images in the JPG format may be obtained.

In this embodiment, the obtained image in the chrominance-luminance separated color mode may be an image in YUV color mode or an image in LAB color mode. When the method for image processing of the present disclosure is applied in a mobile phone, alternatively, the image in the chrominance-luminance separated color mode may be an image in YUV color mode, and the image in YUV color mode may be processed without any redundant image conversion procedures after being captured by the image capture apparatus, reducing the process of image conversion and improving efficiency of image processing.

In one embodiment, the image in the chrominance-luminance separated color mode may be captured by the camera according to an image capture instruction. The image may also be image information captured by the camera and displayed on a screen of the electronic device for users to preview, before the shooting instruction is executed for the camera.

At block 102, luminance components of all pixels of the image may be traversed, and the number of pixels corresponding to each luminance component may be determined.

To be exemplary, a luminance component of each pixel of the image may be traversed. For example, in an image in YUV color mode, Y component of each pixel of the image may be extracted, and statistics of pixels corresponding to each luminance component may be conducted. Alternatively, data of image in YUV color mode may be stored in a planar format. That is, the Y, U, and V components may be stored in three different matrices, respectively. When the luminance components of all pixels of the image is traversed, the matrix storing the Y component may be read, and then the luminance component of each pixel of the image may be obtained.

At block 103, a luminance distribution of the image may be generated based on the luminance components and the number of pixels corresponding to each luminance component.

Figure 2A:
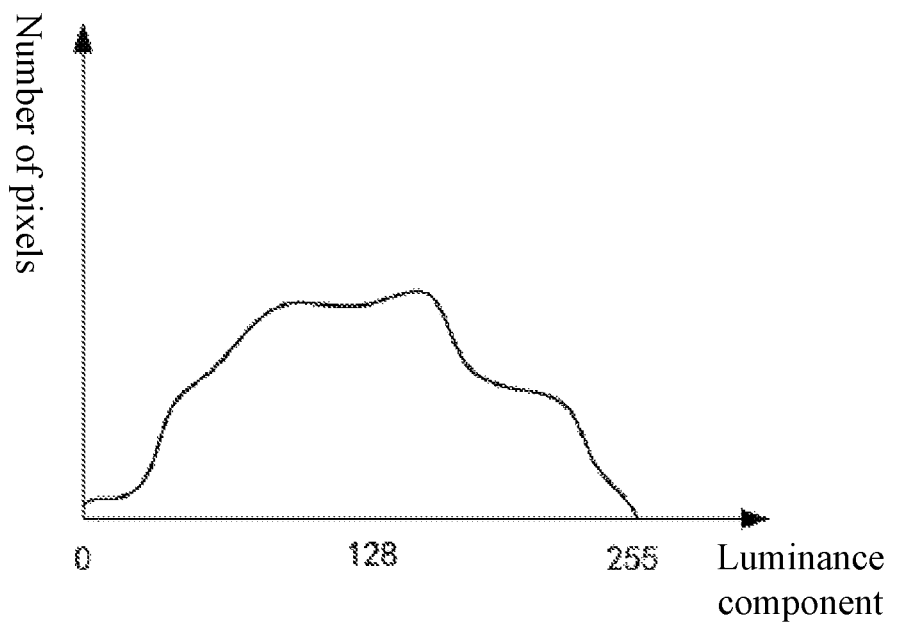
FIG. 2A is a diagram illustrating luminance distribution provided by an embodiment of the present disclosure.

Data of the luminance distribution may be illustrated in a histogram, a luminance distribution curve or an integral image. Alternatively, the luminance distribution may be a luminance distribution graph. To be exemplary, FIG. 2A is a diagraph for a luminance distribution of the image provided by an embodiment of the present disclosure. In FIG. 2A, the abscissa axis represents all luminance components of the image, which is in a range of 0-255, and the ordinate axis represents the number of pixels corresponding to each luminance component. The luminance distribution may indicate color brightness of the image. When pixels with the luminance components of 1-128 is in large proportion, it may indicate that the brightness of the image is lower, and when pixels with the luminance components of 128-155 is in large proportion, it may indicate that the brightness of the image is higher.

At block 104, a luminance mapping relationship may be generated based on a preset standard luminance distribution and the luminance distribution of the image.

Figure 2B:
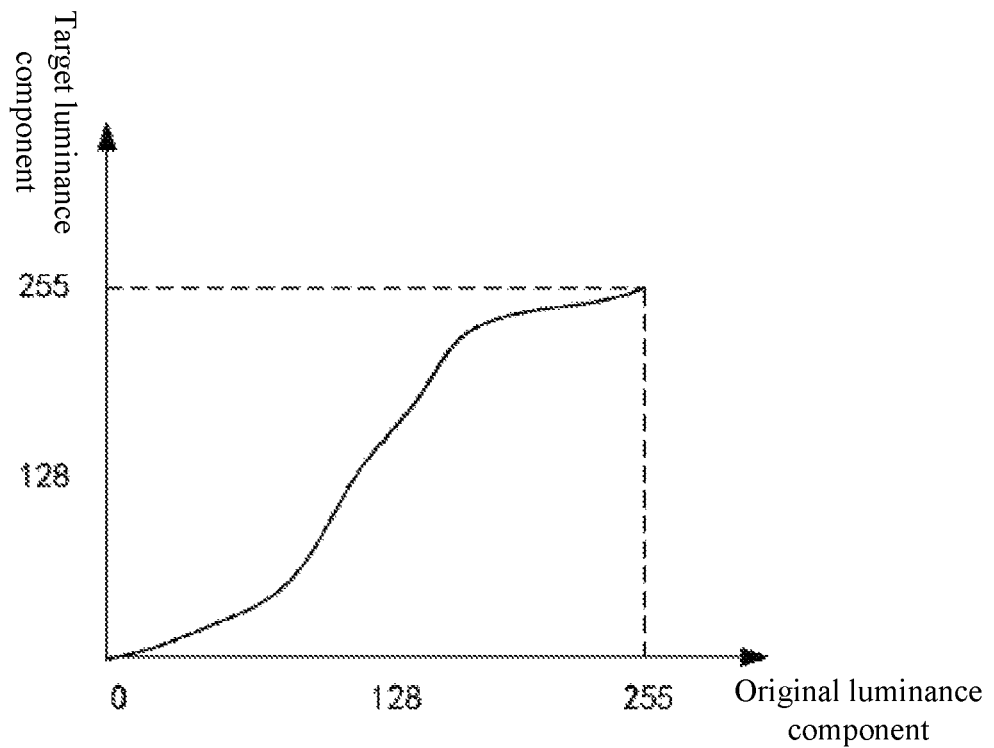
FIG. 2B is a diagram illustrating a curve of luminance mapping relationship provided by an embodiment of the present disclosure.

The preset standard luminance distribution may include a standard ratio of the number of pixels corresponding to each luminance component of 0-255 to the total number of the pixels of the entire image. When the luminance distribution of the image satisfies with the preset standard luminance distribution, the image may meet users' requirements for image brightness. When the luminance distribution of the image is different from the preset standard luminance distribution, luminance components of pixels of the image may be adjusted so that the adjusted luminance distribution of the image may be consistent with that the preset standard luminance distribution, or the differences therebetween may be within a margin of error. In one embodiment, the luminance mapping relationship may include correspondence between the original luminance distribution of the image and the target luminance components, which is configured to adjust the luminance components of the pixels in the image to be the target luminance components so that the adjusted luminance distribution of the image may satisfy with the preset standard luminance distribution. To be exemplary, FIG. 2B is a curve of a luminance mapping relationship provided by embodiments of the present disclosure. The luminance mapping relationship may be illustrated in the form of a curve or a look-up table (LUT), which will not be limited herein, and FIG. 2B is only an embodiment of a curve illustrating the luminance mapping relationship. In FIG. 2B, the abscissa axis of the curve represents the original luminance components of the image, and the ordinate axis of the curve represents the adjusted luminance components, which are target luminance components. Alternatively, at block 104, a table for the luminance mapping relationship is generated based on a graph for the preset standard luminance distribution and a graph for the luminance distribution of the image. That is, a table for the luminance mapping relationship between the preset standard luminance distribution and the luminance distribution is generated.

Alternatively, one or more of the preset standard luminance distributions may be available. When a plurality of preset standard luminance distributions are available, different preset standard luminance distributions may relate to different scene modes, including but not limiting to, for example, a soft light mode, a cold mode, a bright mode, a sunshine mode, a sunrise mode, a sunset mode and the like.

According to a scene mode selected by the user, a corresponding preset standard luminance distribution may be determined, and further, a luminance mapping relationship corresponding to the scene mode may be determined.

At block 105, the luminance components of the pixels of the image may be adjusted based on the luminance mapping relationship to generate a processed image.

Each pixel of the image may be traversed to obtain a luminance component of each pixel. A target luminance component corresponding to the luminance component may be determined based on the luminance mapping relationship, the luminance component of each pixel may be adjusted to be the target luminance component to achieve brightness adjustment of the image, and then the processed image may be obtained.

In one embodiment, a preview image or a captured image in YUV color mode captured by a camera may be displayed on a display interface of an electronic device (e.g. a mobile phone), and an instruction for color enlargement input by a user may be fetched. The instruction for color enlargement may be input in a way that the user clicks a virtual controller (for example, a proportional integral controller) on the display interface, or by the user's touching gestures or voice commands. According to the instruction for color enlargement, the luminance components of the image displayed on the display interface may be traversed, and then luminance distribution of the image may be generated. At the same time, a corresponding standard luminance distribution may be retrieved according to a scene mode selected by the user, a luminance mapping relationship may be generated based on the luminance distribution of the image and the standard luminance distribution of the selected scene mode, and the image displayed on the display interface may be adjusted based on the luminance mapping relationship, and then a adjusted image may be obtained. In the present embodiment, the mapping may be performed on the Y component only without any impact on the ratio of U and V, such that the chrominance components may not be changed at all, which means the colors of the image may remain as original, and the distortion may not occur at any region of the image. The colors may be virtually enlarged by changing brightness, improvement of color expression may be achieved without harming the colors, so that the colors may be sheerer and brighter.

In the method for image processing provided by embodiments of the present disclosure, an image in a chrominance-luminance separated color mode is obtained, the luminance components of all pixels of the image are traversed, the number of pixels corresponding to each of the luminance components is determined, a luminance distribution of the image is generated based on the luminance components and the number of pixels corresponding to the each luminance component, a luminance mapping relationship is generated based on a preset standard luminance distribution and the luminance distribution of the image, and then the luminance component of each pixel of the image is adjusted based on the luminance mapping relationship to obtain a processed image. Through the above-mentioned technical solution, the luminance components of the image in the chrominance-luminance separated color mode may be extracted, analyzed and processed, so that the luminance components of the image may be adjusted to be a preset standard status, and the image may be brightened to exhibit more details and improve resolution of the image. At the same time, as the luminance components may be processed independently and adjustment of chrominance components may not be involved, it ensures that the colors of the image may remain as original without any impact and changes to the colors during the image processing, which may be guaranteed that the colors have high resolution without distortion.

Figure 3:
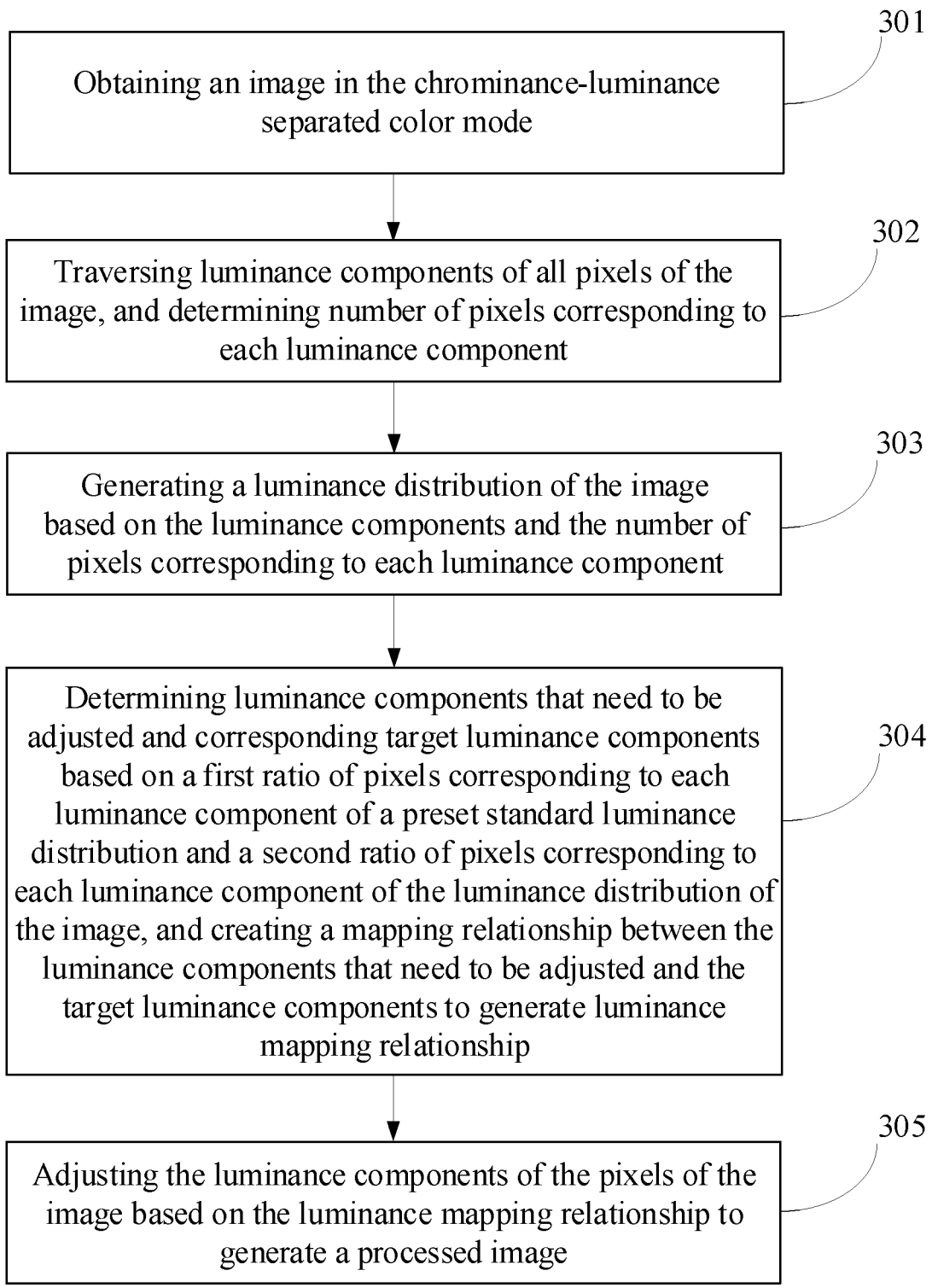
FIG. 3 is a flow chart illustrating another method for image processing provided by an embodiment of the present disclosure.

FIG. 3 is a flow chart illustrating another method for image processing provided by embodiments of the present disclosure. Referring to FIG. 3, the method may include actions/operations in the following blocks.

At block 301, an image in a chrominance-luminance separated color mode may be obtained.

At block 302, luminance components of all pixels of the image may be traversed, and the number of pixels corresponding to each of the luminance components may be determined.

At block 303, a luminance distribution of the image may be generated based on the luminance components and the number of pixels corresponding to each luminance component.

At block 304, the method determines luminance components that need to be adjusted in the image and corresponding target luminance components in the preset standard luminance distribution based on a first ratio of pixels corresponding to each luminance component of a preset standard luminance distribution and a second ratio of pixels corresponding to each luminance component of the luminance distribution of the image, and creates a mapping relationship between the luminance components that need to be adjusted and the target luminance components to generate luminance mapping relationship.

To be exemplary, for any one of luminance components, when a first ratio of pixels of the luminance component in the standard luminance distribution is different from a second ratio of pixels of the corresponding luminance component in the image, other luminance components in the original luminance distribution of the image may need to be adjusted. That is, the preset standard luminance distribution comprises a plurality of first ratios, and each first ratio indicates a ratio of a number of pixels corresponding to one target luminance component to a total number of pixels in the image, and the original luminance distribution of the image comprises a plurality of second ratios, and each second ratio indicates a ratio of a number of pixels corresponding to one luminance component to a total number of pixels in the image. To be specific, when a first ratio of pixels of a first luminance component in the standard luminance distribution is greater than the second ratio of pixels of the first luminance component in the image, other luminance components in the original luminance distribution may be mapped to be the first luminance component to improve the second ratio of pixels of the first luminance component in the image, such that a mapping between other luminance components in the original luminance distribution and the first luminance component in the preset standard luminance distribution. The other luminance components may be luminance components that need to be adjusted, and a mapping relationship between the other luminance components in the original luminance distribution and the target luminance component (i.e. the first luminance component in the standard luminance distribution) may be generated. To be exemplary, the other luminance components may be luminance components located in intervals adjacent to the first luminance component. Ratios of pixels corresponding to the other luminance components that need to be adjusted may be equal to a difference value between the first ratio of pixels and the second ratio of pixels, or may be within an error range of the difference value. Similarly, when a first ratio of pixels of a second luminance component in the standard luminance distribution is less than that of the second luminance component in the to-be-processed image, the second luminance component in the to-be-processed image may be determined to be adjusted to reduce the ratio of the second pixels of the second luminance component of the to-be-processed image.

Alternatively, the luminance components may be analyzed and processed in an order of values of the luminance components, for example, in a numerical increasing order of the luminance components from 0 to 255, or in a numerical decreasing order of the luminance components from 255 to 0. To be exemplary, taking a luminance component being 0 as an example, generating the luminance mapping relationship may be introduced herein. When a first ratio of pixels of the luminance component being 0 in the standard luminance distribution is greater than a second ratio of pixels of the luminance component being 0 in the to-be-processed image, a difference value between the first ratio of pixels and the second ratio of pixels may be determined. When a ratio of pixels of luminance components in an interval of 1-5 is equal or close to the above mentioned difference, the luminance components in the interval of 1-5 may be determined as the luminance components that need to be adjusted and the luminance component being 0 in the standard luminance distribution may be determined as a target luminance component, so that a mapping relationship between the luminance component being 0 and the luminance components in an interval of 1-5 is generated. That is, in the luminance mapping relationship, the luminance components in the interval of 1-5 may be mapped to be the luminance component being 0. In such a way, the luminance mapping relationship may be generated.

To be noted that, the luminance components of an image captured by the electronic device may be in the range of 0-255 or in any sub-range within the range of 0-255. For example, the luminance components of the image may be in a range of 30-200, which means the number of pixels, of which luminance components are in the range of 0-30 and the range of 200-255, may be 0. Through generating a luminance mapping relationship, the luminance components in the range of 30-200 may be mapped into the range of 0-255 to extend the range of the luminance components of the captured image, so that bright areas of the image may be even brighter and dark areas of the image may be even darker. Thus, the colors may be enlarged, and the image resolution may be improved.

At block 305, the luminance components of pixels in the image may be adjusted based on the luminance mapping relationship to generate a processed image.

According to the method for image processing provided by embodiments of the present disclosure, the mapping relationship of luminance components may be determined based on the ratios of pixels of corresponding luminance components in the standard luminance distribution and in the luminance distribution of the to-be-processed image, so as to generate the luminance mapping relationship. After the luminance components of all pixels in the image have been determined, target luminance components may be determined immediately by looking up the luminance mapping relationship. Compared with performing a function mapping to each pixel, the method provided herein may improve efficiency of processing images, reducing time consumed for image processing and bringing better user experience.

Figure 4:
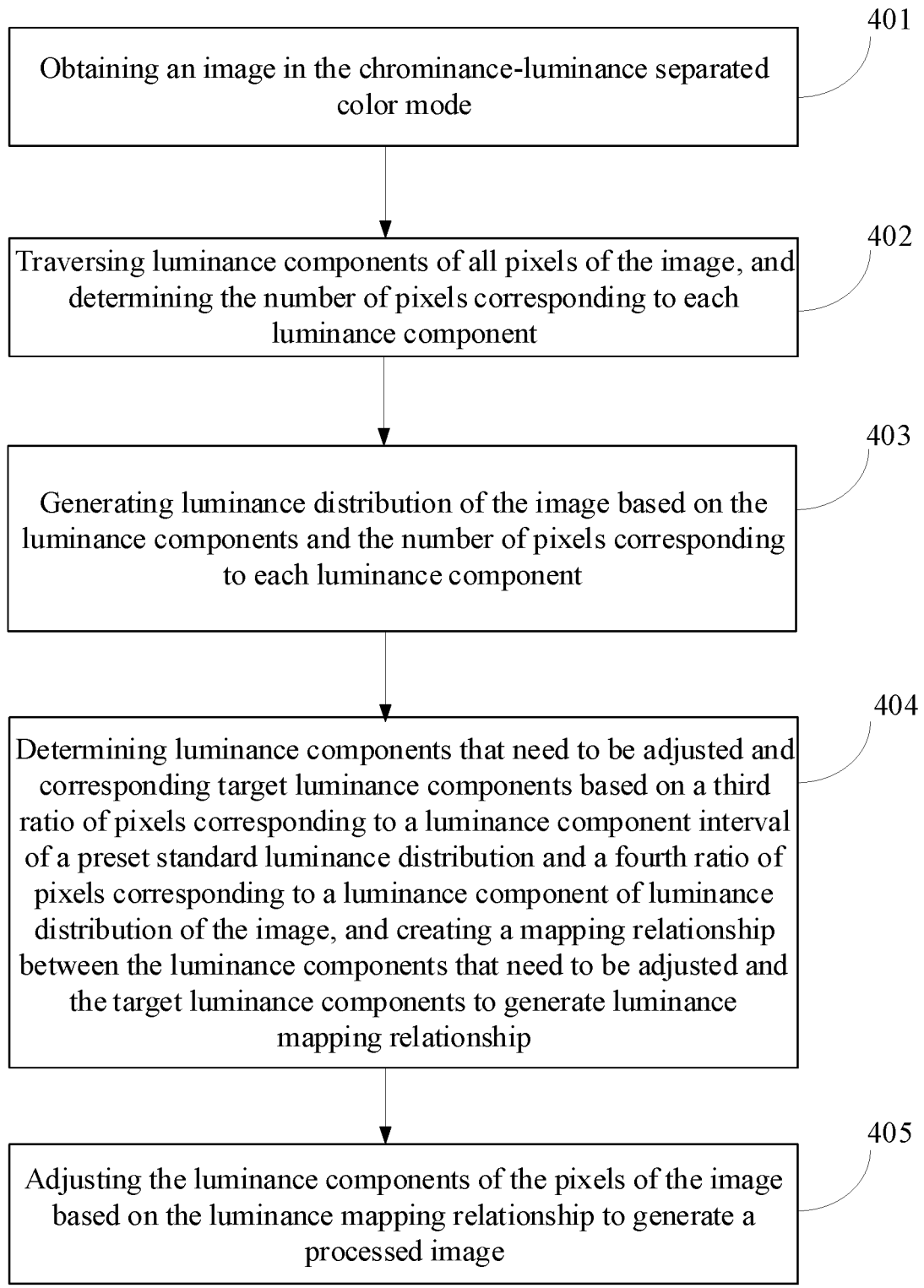
FIG. 4 is a flow chart illustrating yet another method for image processing provided by an embodiment of the present disclosure.

FIG. 4 is a flow chart illustrating yet another method for image processing provided by an embodiment of the present disclosure. Referring to FIG. 4, the method provided by the present embodiment may include actions/operations in the following block.

At block 401, an image in a chrominance-luminance separated color mode may be obtained.

At block 402, luminance components of all pixel of the image may be traversed, and the number of pixels corresponding to each of the luminance components may be determined.

At block 403, a luminance distribution of the image may be generated based on the luminance components and the number of pixels corresponding to each luminance component.

At block 404, the method determines luminance components that need to be adjusted in the image and corresponding target luminance components in preset standard luminance distribution based on a third ratio of pixels corresponding to a luminance component interval of a preset standard luminance distribution and a fourth ratio of pixels corresponding to a corresponding luminance component interval of the luminance distribution of the image, and creates a mapping relationship between the luminance components that need to be adjusted and the target luminance components to generate luminance mapping relationship.

At block 405, the luminance components of pixels in the image may be adjusted based on the luminance mapping relationship to generate a processed image.

In the present embodiment, the luminance components 0-255 may be divided into a plurality of luminance component intervals. Luminance component intervals may be analyzed and processed to generate the luminance mapping relationship. Principles for generating the luminance mapping relationship may be the same as those described in the above embodiments, which will not be repeatedly described herein.

To be exemplary, a luminance component interval [0, 10] may be used as an example to introduce the method for generating the luminance mapping relationship. When a third ratio of pixels corresponding to the luminance component interval [0, 10] in the standard luminance component distribution is greater than a fourth ratio of pixels corresponding to the luminance component interval [0, 10] of the to-be-processed image, a difference value between the third ratio of pixels and the fourth ratio of pixels may be determined. When a ratio of pixels corresponding to a luminance component interval [10, 15] is equal to or close to the above-mentioned difference value, the luminance components in the luminance component interval [10, 15] are determined as luminance components that need to be adjusted, and the luminance components in the luminance components interval [0, 10] in the standard luminance component distribution are determined as target luminance components. Thus, a mapping relationship between the luminance components interval [0, 10] and the luminance component interval [0, 15] may be generated. To be exemplary, each luminance component within the luminance component interval [0, 15] may be multiplied by $\frac{2}{3}$ to obtain target luminance components. For example, a mapping relationship may be generated between the luminance component 15 and the target luminance component 10, a mapping relationship may be generated between the luminance component 12 and the target luminance component 8, a mapping relationship may be generated between the luminance component 9 and the target luminance component 6, and the rest can be done in the same manner. Accordingly, mapping relationship of each luminance component interval within the range of 0-255 may be determined in order, so that the luminance mapping relationship may be generated.

The broader the luminance component interval, the faster the luminance mapping relationships may be generated, and the less accurate the luminance mapping relationships are. In turn, the narrower the luminance component interval, the slower the luminance mapping relationship may be generated, and the more accurate the luminance mapping relationships are. the luminance component intervals may be determined by referring the speed and the accuracy of generating the luminance mapping relationship.

According to the method for image processing provided by embodiments of the present disclosure, the mapping relationship of luminance components may be determined based on the ratios of pixels of a corresponding luminance component interval in the standard luminance distribution and in the luminance distribution of the to-be-processed image, so as to generate the luminance mapping relationship. After the luminance components of all pixels in the image have been determined, target luminance components may be determined immediately by looking up the luminance mapping relationship. Compared with performing a function mapping to each pixel, the method provided herein may improve efficiency of processing images, reducing time consumed for image processing and bringing better user experience.

Figure 5:
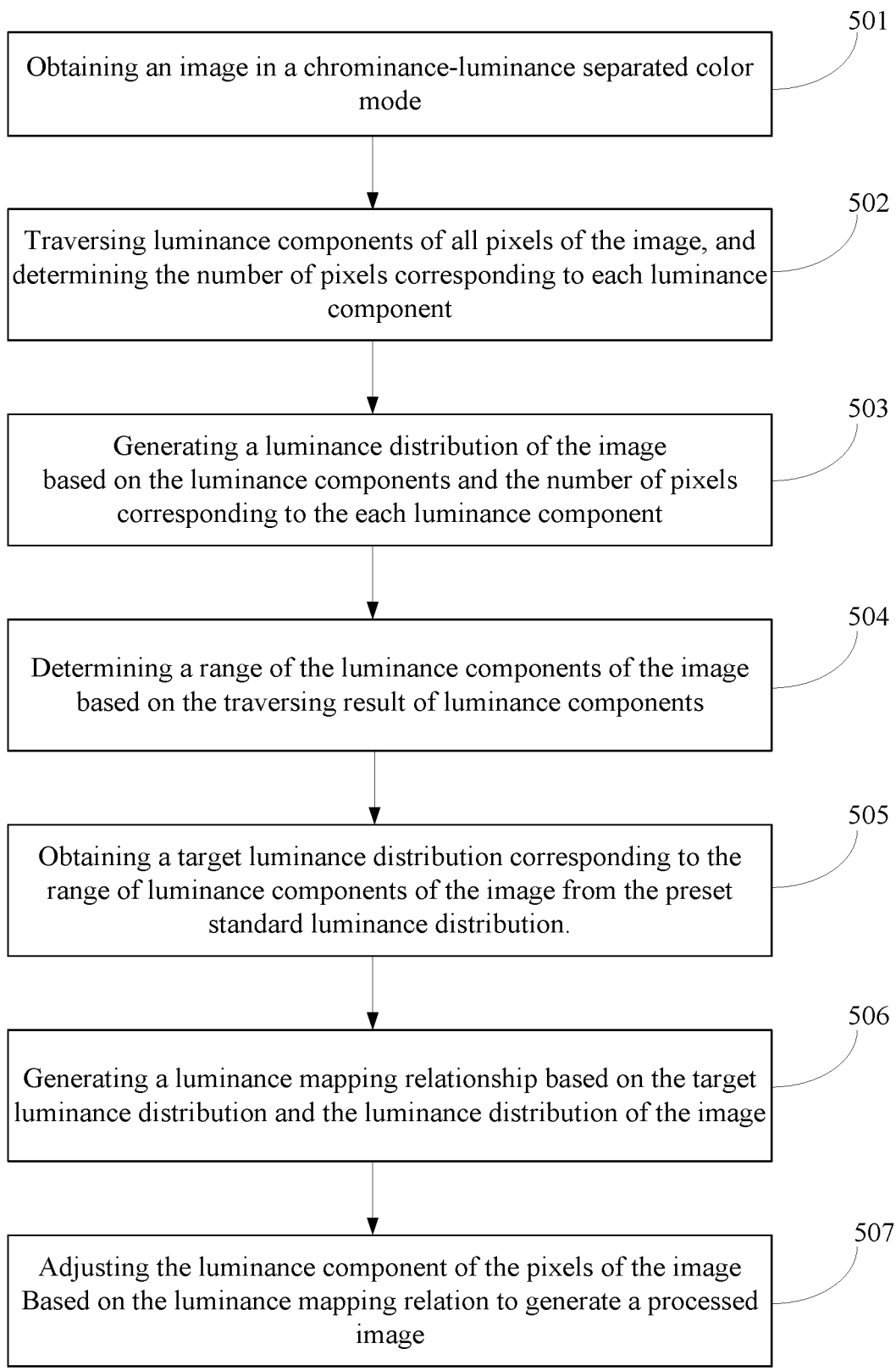
FIG. 5 is a flow chart illustrating yet another method for image processing provided by an embodiment of the present disclosure.

FIG. 5 is a flow chart illustrating yet another method for image processing provided by an embodiment of the present disclosure. Referring to FIG. 5, the method provided by the present embodiment may include actions/operations in the following blocks.

At block 501, an image in a chrominance-luminance separated color mode may be obtained.

At block 502, luminance components of all pixel of the image may be traversed, and the number of pixels corresponding to each of the luminance components may be determined.

At block 503, a luminance distribution of the image may be generated based on the luminance components and the number of pixels corresponding to each luminance component.

At block 504, a range of the luminance components of the image may be determined based on the result of the traversing.

The luminance component with maximum value and the luminance component with minimum value may be determined according to the traversal result of the luminance components. Further, the range of the luminance components of the image may be a range between the minimum value and the maximum value. For example, the maximum value is 200 and the minimum value is 50, the range of the luminance components of the image may be 50-200.

At block 505, the method obtains a target luminance distribution corresponding to the range of luminance components of the image from the preset standard luminance distribution.

To be exemplary, the luminance component range in the standard luminance distribution is 0-255, and when an image captured by an electronic device has luminance components in a range of 0-255, the standard luminance distribution may not need to be truncated. A luminance mapping relationship may be generated based on the preset standard luminance distribution and the luminance distribution of the image. When the luminance component range of the image captured by the electronic device is a subset of the range of 0-255, the standard luminance distribution may be truncated based on the maximum value and the minimum value, so as to obtain a range between the maximum value and the minimum value, which is treated as the target luminance distribution. For example, when the luminance component range of the image is 50-200, the luminance components within the range of 50-200 in the standard luminance distribution may be truncated to be the target luminance distribution.

At block 506, a luminance mapping relationship may be generated based on the target luminance distribution and the luminance distribution of the image.

The principles for generating the luminance mapping relationship based on the target luminance distribution and the luminance distribution of the image is the same as the principles for generating the luminance mapping relationship based on the preset standard luminance distribution and the luminance distribution of the image, of which detailed description will not be provided herein. Analysis may be performed in unit of luminance component or unit of luminance component interval to generate the luminance mapping relationship.

At block 507, the luminance components of pixels in the image may be adjusted based on the luminance mapping relationship to generate a processed image.

According to the method for image processing provided by embodiments of the present disclosure, a luminance component range may be determined based on the result of the traversing luminance components of pixels of the image. Target luminance distribution, which corresponds to the luminance component range of the image, may be truncated from the preset standard luminance distribution. A luminance mapping relationship may be generated based on the target luminance distribution and the luminance distribution of the image to adjust the luminance components of the image and then obtain a processed image. Within the range of the luminance components of the image, the luminance may be adjusted to be standard status, the luminance of the image may be adjusted appropriately to improve image quality.

Figure 6:
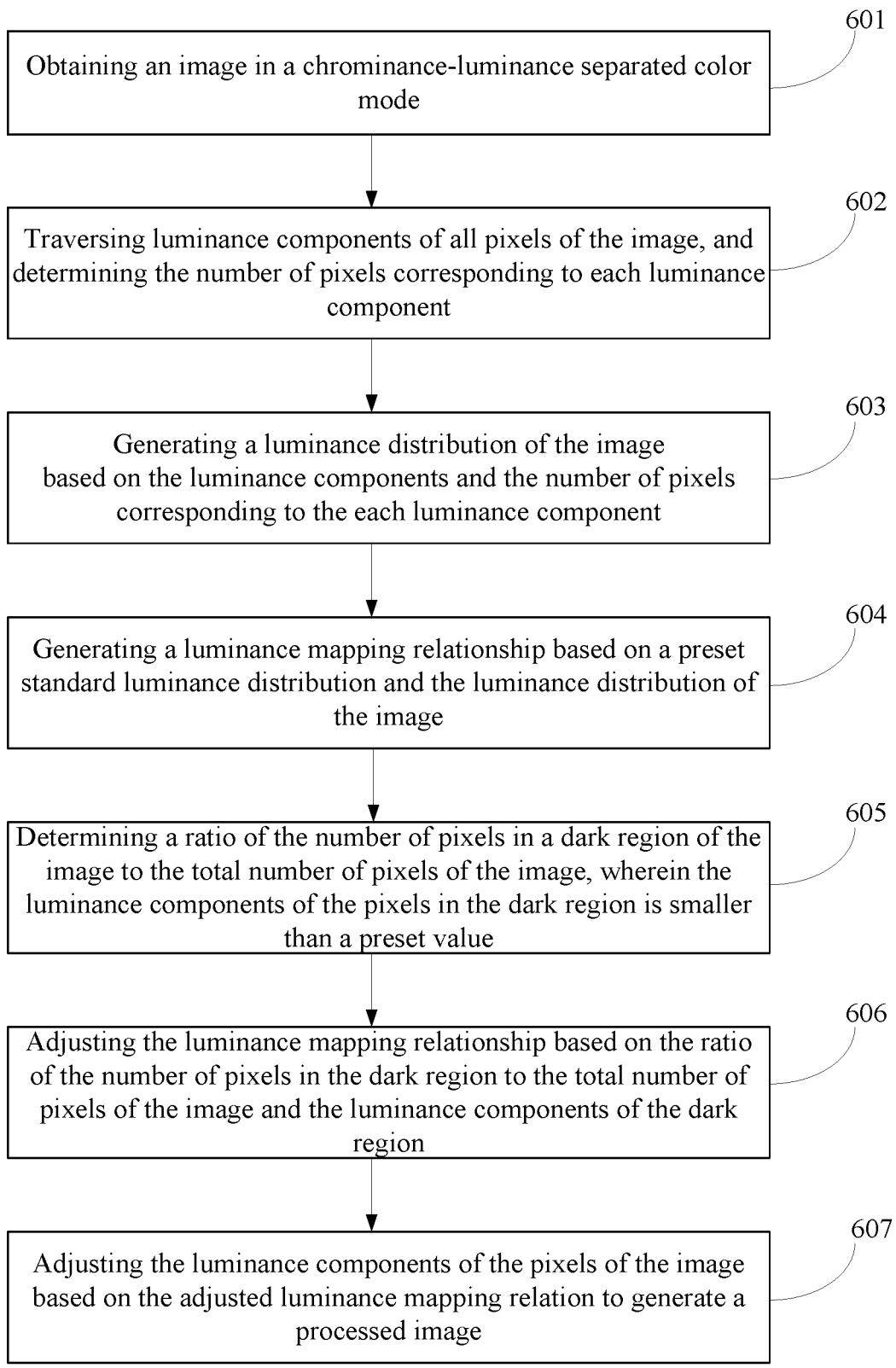
FIG. 6 is a flow chart illustrating yet another method for image processing provided by an embodiment of the present disclosure.

FIG. 6 is a flow chart illustrating yet another method for image processing provided by an embodiment of the present disclosure. Referring to FIG. 6, the method provided by the present embodiment may include actions/operations in the following blocks.

At block 601, an image in a chrominance-luminance separated color mode may be obtained.

At block 602, luminance components of all pixel of the image may be traversed, and the number of pixels corresponding to each of the luminance components may be determined.

At block 603, a luminance distribution of the image may be generated based on the luminance components and the number of pixels corresponding to each luminance component.

At block 604, a luminance mapping relationship may be generated based on a preset standard luminance distribution and the luminance distribution of the image.

At block 605, a ratio of the number of pixels in a dark region of the image to the total number of pixels of the image may be determined, wherein the luminance components of the pixels in the dark region may be smaller than a preset value.

At block 606, the luminance mapping relationship may be adjusted based on the ratio of the number of pixels in the dark region in the image to the total number of the pixels in the image and the luminance components of the dark region.

The dark region in the image are a region having luminance components with values smaller than the preset value. When colors of the image are enlarged overall, noise may be easy to be introduced, impacting image quality. In one embodiment, target luminance components, which corresponds to the luminance components of the dark region in the luminance mapping relationship, may be adjusted to reduce the risk of noise enlargement.

In one embodiment, the target luminance components, which correspond to the luminance components of the dark region in the luminance mapping relationship, may be adjusted, wherein the adjustment may be related to an area of the dark region. That is, the adjustment may be related to the ratio of the number of pixels in the dark region to the total number of pixels in the image. Alternatively, the adjustment may include: determining an adjust value for the luminance components of the dark region based on the ratio of the number of pixels in the dark region to the total number of pixels in the image; and adjusting the luminance mapping relationship based on the adjust value for the luminance components of the dark region. The adjust value for the luminance components of the dark region may be negatively correlated with the ratio of the number of pixels of the dark region in the image to the total number of pixels of the image. For example, a greater ratio of the number of pixels of the dark region in the image to the total number of pixels of the image may indicate larger area of the dark region in the image, and the adjust value may be set to be smaller to assure exhibition of details in the dark region with larger area. When the ratio of the number of pixels of the dark region in the image to the total number of pixels of the image is smaller, the adjust value may be set to be greater to improve contrast of the dark region with smaller area. The luminance components in the dark region may have identical or different adjust values.

After the adjust value for the luminance components of the dark region has been determined, the adjust value may be subtracted accordingly from the mapping luminance components corresponding to the luminance components of the dark region in the luminance mapping relationship to obtain an adjusted luminance mapping relationship. To be exemplary, the dark region may have luminance components 1-20. For example, the luminance component 20 may correspond to a target luminance component 25, and an adjust value may be 3, then it may be determined that, the luminance component 20 may correspond to a target luminance component 22 in the adjusted luminance mapping relationship.

At block 607, the luminance components of the pixels of the image may be adjusted based on the adjusted luminance mapping relationship to generate a processed image.

According to the image processing method provided by embodiments of the present disclosure, after the luminance mapping relationship is generated, the target luminance components corresponding to the luminance components of the dark region may be adjusted based on a ratio of the dark region to the image, avoiding introducing noise into the dark region during adjusting the brightness of the image and then improving image quality.

Figure 7:
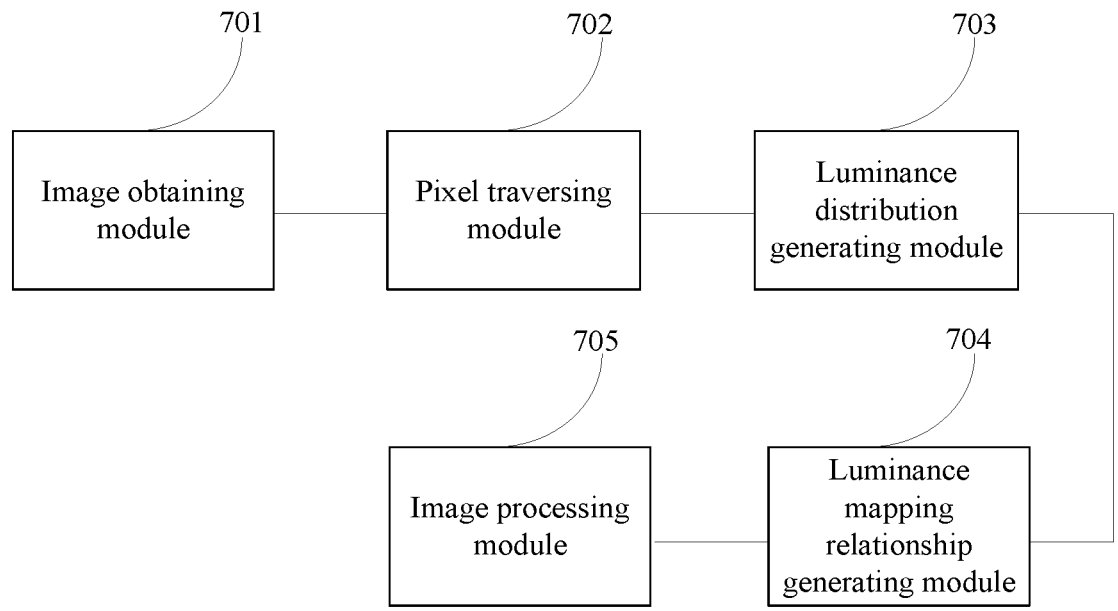
FIG. 7 is a structural view of an apparatus for image processing provide by an embodiment of the present disclosure.

FIG. 7 is a structural view of an apparatus for image processing provided by an embodiment of the present disclosure. The apparatus may be realized by software and/or hardware and may usually be integrated into an electronic device to execute the method for image processing. Referring to FIG. 7, the apparatus may include an image obtaining module 701, a pixel traversing module 702, a luminance distribution generating module 703, a luminance mapping relationship generating module 704, and an image processing module 705.

The image obtaining module 701 may be used to obtain an image in a chrominance-luminance separated color mode.

The pixel traversing module 702 may be used to traverse the luminance component of all pixels of the image and determine the number of pixels corresponding to each luminance component.

The luminance distribution generating module 703 may be used to generate a luminance distribution of the image based on the luminance components and the number of pixels corresponding to each luminance component.

The luminance mapping relationship generating module 704 may be used to generate a luminance mapping relationship based on a preset standard luminance distribution and the luminance distribution of the image.

The image processing module 705 may be used adjust the luminance components of the pixels of the image based on the luminance mapping relationship to generate a processed image.

According to the image processing apparatus provided by embodiments of the present disclosure, the luminance components of the image in the chrominance-luminance separated color mode may be extracted, analyzed and processed, so that the luminance components of the image may be adjusted to a preset standard status, and the image may be brightened to exhibit more details and improve resolution of the image. At the same time, as the luminance components may be processed independently and adjustment of chrominance components may not be involved, it ensures that the colors of the image may remain as original without any impact and changes to the colors during the image processing, which may be guaranteed that the colors have high resolution without distortion.

Dependent on the above embodiments, the luminance mapping relationship generating module 704 may be used to:

determine luminance components that need to be adjusted and corresponding target luminance components based on a first ratio of pixels corresponding to each luminance component of a preset standard luminance distribution and a second ratio of pixels corresponding to each luminance component of the luminance distribution of the image, and create a mapping relationship between the luminance components that need to be adjusted and the target luminance components.

Dependent on the above embodiments, the luminance mapping relationship generating module 704 may be used to:

determine luminance components that need to be adjusted and corresponding target luminance components based on a third ratio of pixels corresponding to a luminance component interval of a preset standard luminance distribution and a second ratio of pixels corresponding to a luminance component of luminance distribution of the image, and create a mapping relationship between the luminance components that need to be adjusted and the target luminance components Dependent on the above embodiments, the luminance mapping relationship generating module 704 may include:

a luminance component range determination unit, which may be used to determine a range of the luminance components of the image based on the traversal result of the luminance components;

a target luminance distribution determination unit, which may be used to obtains a target luminance distribution corresponding to the range of luminance components of the image from the preset standard luminance distribution; and a luminance mapping relationship generating unit, which may be used to generate the luminance mapping relationship based on the target luminance distribution and the luminance distribution of the image.

Dependent on the above embodiments, the apparatus may also include:

a determination module for the number of pixels of dark region, which may be used to determine a ratio of the number of pixels of the dark region in the image to the total number of pixels in the image after the luminance mapping relationship is generated, wherein the luminance components of the pixels within the dark region may be smaller than a preset value; and an adjustment module for luminance mapping relationship, which may be used to adjust the luminance mapping relationship based on the ratio of the number of the pixels in the dark region to the total number of pixels in the image and the luminance components of the dark region.

Dependent on the above embodiments, the adjustment module for luminance mapping relationship may be used to: determine an adjust value for the luminance components of the dark region based on the ratio of the number of pixels of the dark region to the total number of pixels in the image; and adjusting the luminance mapping relationship based on the adjust value for the luminance components of the dark region.

Dependent on the above embodiments, the chrominance-luminance separated color modes may be a YUV color mode, a LAB color mode or a HSV color mode.

Dependent on the above embodiments, the apparatus may also include:

a generating module for YUV color mode image, which may be used to convert raw signals captured by an image sensor into an image in the RGB color mode, and generate an image in the YUV color mode based on the image in the RGB color mode.

The present disclosure may further provide a storage medium, which may include instructions executable by computers, wherein the instructions may be used to execute the method for image processing while executed by a processor of the computer, the method may include: obtaining an image in a chrominance-luminance separated color mode; traversing luminance components of all pixels in the image, and determining a number of pixels corresponding to each luminance component; generating a luminance distribution of the image based on the luminance components and the number of the pixels corresponding to each luminance components; generating a luminance mapping relationship based on a preset standard luminance distribution and the luminance distribution of the image; and adjusting the luminance components of the pixels based on the luminance mapping relationship to obtain a processed image.

A storage medium may be any type of non-transitory memory devices or storage devices. The term "storage medium" intends to include an installation medium, such as devices of CD-ROM, a floppy disk or a tape; non-transitory memory of a computer system or random access memory, such as DRAM, DDRRAM, SRAM, EDORAM, Rambus RAM and the like; non-volatile memory, such as flash memory, magnetic medium (such as hard disk or optical storage); a register or other types of elements for storage. The storage medium may also include other types of storage or combination thereof. In addition, the storage medium may be located in a first computer system of which programs may be executed, or located in a second computer system different from the first one, wherein the second computer system may be connected to the first computer system via a network (such as internet). The second computer system may provide systemic instructions for the first computer to execute. The term "storage medium" may include two or more storage media residing at different locations (for example, different computer systems connected via internet). The storage medium may store program instructions, which can be executed by one or more processors (for example, a specific realization may be a computer program).

An embodiment of the present disclosure may provide a storage medium including instructions executable by computers, wherein the instructions executable by computers may not be limited to the above-mentioned operations for image processing, but may include any related operations of the image processing methods provided by any of the embodiments in the present disclosure.

Figure 8:
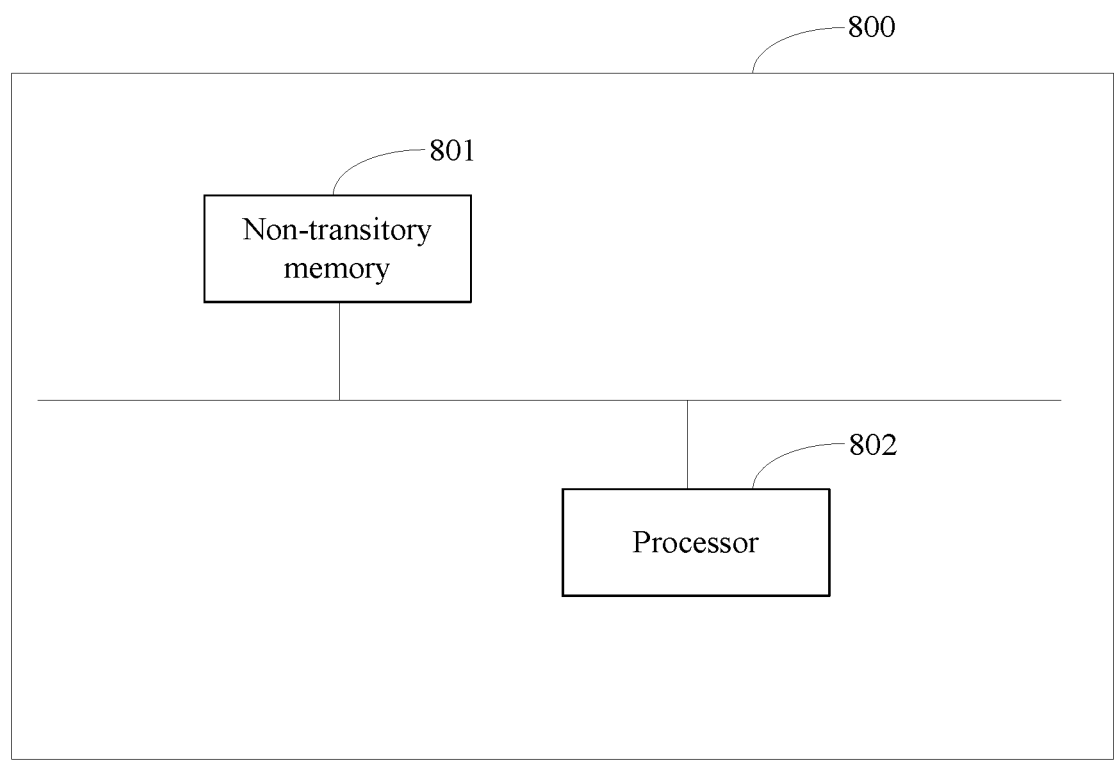
FIG. 8 is a structural view of an electronic device provided by an embodiment of the present disclosure.

The present disclosure may provide an electronic device, which may integrate an image processing apparatus provided by embodiments of the present disclosure. FIG. 8 is a structural view of an electronic device provided by embodiments of the present disclosure. The electronic device 800 may include a non-transitory memory 801, a processor 802, and a computer program stored in the non-transitory memory 801 and executed by the processor 802, wherein the processor 802 may execute the computer program to realize the method for image processing as described by the present disclosure.

The electronic device provided by embodiments of the present disclosure may extract, analyze and process the luminance components of the image in the chrominance-luminance separated color mode, so that the luminance components of the image may be adjusted to a preset standard status, and the image may be brightened to exhibit more details and improve resolution of the image. At the same time, as the luminance components may be processed independently and adjustment of chrominance components may not be involved, it ensures that the colors of the image may remain as original without any impact and changes to the colors during the image processing, which may be guaranteed that the colors have high resolution without distortion.

Figure 9:
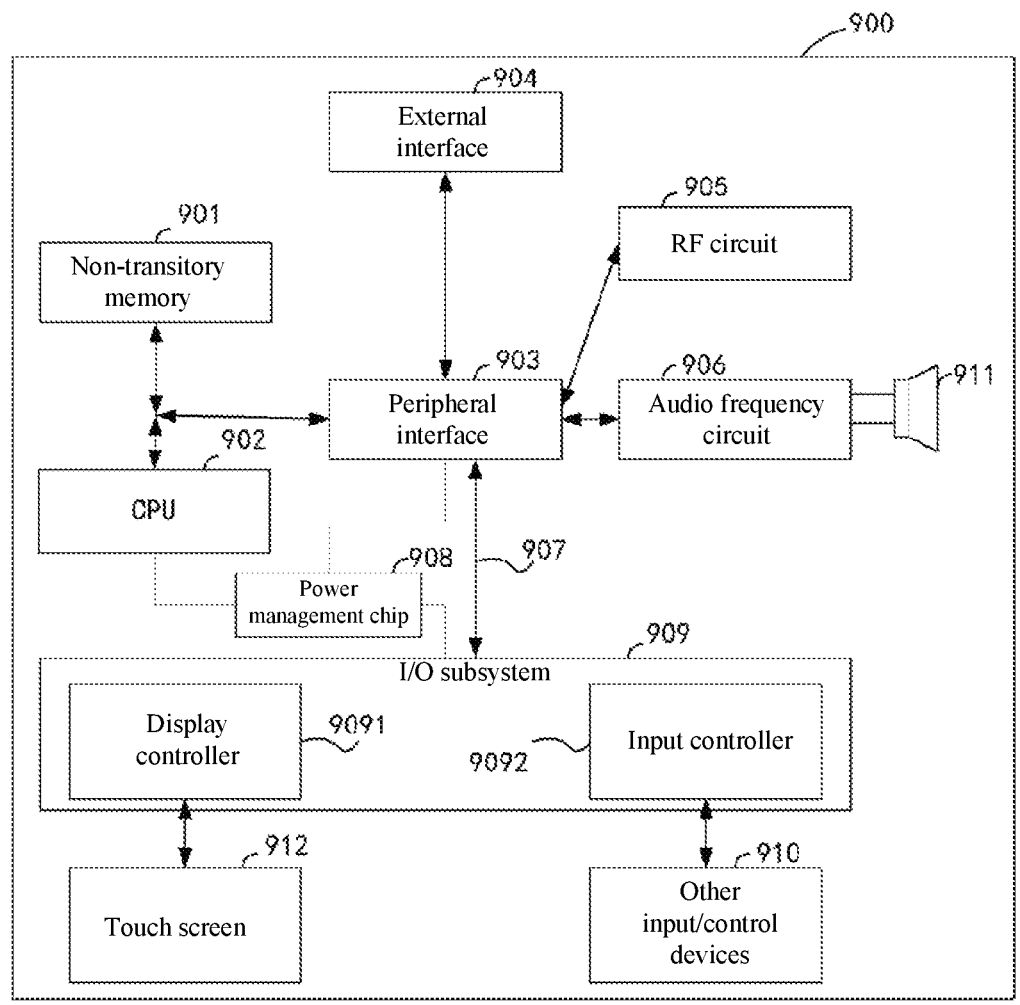
FIG. 9 is a structural view of another electronic device provided by an embodiment of the present disclosure.

FIG. 9 is a structural view of another electronic device provided by embodiments of the present disclosure. The electronic device may include a housing (not shown in the figure), a non-transitory memory 901, a central processing unit (CPU) 902, a circuit board (not shown in the figure), and a power circuit (not shown in the figure). The circuit board may be disposed within the space defined by the housing. The CPU 902 and the non-transitory memory 901 may be arranged on the circuit board. The power circuit may provide power to each circuit or element of the electronic device. The non-transitory memory 901 may store codes for executable programs. The CPU 902 may run computer programs corresponding to the executable program codes by reading the executable program codes stored in the non-transitory memory 901. In such a way, the following actions/operations may be achieved.

An image in a chrominance-luminance separated color mode may be obtained.

Luminance components of all pixels of the image may be traversed, and the number of pixels corresponding to each luminance component may be determined.

A luminance distribution of the image may be generated based on the luminance components and the number of pixels corresponding to each luminance component.

A luminance mapping relationship may be generated based on a preset standard luminance distribution and the luminance distribution of the image.

The luminance components of the pixels of the image may be adjusted based on the luminance mapping relationship to generate a processed image.

The electronic device may further include a peripheral interface 903, a radio frequency (RF) circuit 905, an audio-frequency circuit 906, a loudspeaker 911, a power management chip 908, an input/output (I/O) subsystem 909, other input/controlling apparatus 910, a touch screen 912, other input/controlling apparatus 910, and an external interface 904, all of which may communicate through one or more communication buses or signal lines 907.

It should be understood that, the electronic device 900 shown in the figure is only an example of electronic devices, the electronic device 900 may contain more or less of the components than those illustrated in the figure, two or more of the components may be combined, or the arrangement of the components may be changed. The components illustrated in the figure may be realized by hardware, software, or combination thereof, wherein the hardware and software may include one or more signal processors and/or application specific integrated circuits.

The electronic device for image processing operations provided by the present disclosure will be described in details herein, and a mobile phone may be used as an example of the electronic device.

The non-transitory memory 901 may be accessed by the CPU 902, peripheral interface 903 and the like. The non-transitory memory 901 may include high speed random access memory or non-volatile memory such as disk type storage device, a flash memory device, or other volatile solid state memory device.

The peripheral interface 903 may connect input and output of the device to the CPU 902 and the non-transitory memory 901.

The I/O subsystem 909 may set input and output peripheral. For example, the touch screen 912 and other input/controlling devices 910 may be connected to the peripheral interface 903. The I/O subsystem 909 may include a display controller 9091 and one or more input controllers 9092 to control other input/controlling devices 910. The one or more input controllers 9092 may receive electrical signals from other input/controlling devices 910 or send electrical signals to other input/controlling devices 910, wherein the other input/controlling devices 910 may include a physical button (a pressing button, a rocker button and the like), a dial plate, a sliding switch, a joystick, or a clicking wheel. To be noted that, the input controller 9092 may connect to any one of the following: a keyboard, an infrared port, an USB interface, and an indicating equipment such as a mouse.

The touch screen 912 may an input interface and an output interface between a user and the electronic device of the user. Visual output may be displayed to the user, wherein the visual output may include a graph, a text, an icon, a video, and the like.

The display controller 9091 of the I/O subsystem 909 may receive electrical signals from the touch screen 912 or send electrical signals to the touch screen 912. The touch screen 912 may detect touching of the screen, the display controller 9091 may convert the detected touching into an interaction with a user interface object displayed on the touch screen 912, which realizes human-computer interaction. The user interface object displayed on the touch screen 912 may be an icon for running a game, an icon for connecting into a certain network, and the like. To be noted that, the device may also include an optical mouse, which is a touch-sensitive surface without display of visual output or an extension of the touch-sensitive surface defined by the touch screen.

The RF circuit 905 may be used to establish communication between the mobile phones and wireless network (i.e. a network side), realizing data receipt and sending between the mobile phone and the wireless network. For example, receiving and sending messages, emails and the like. To be specific, the RF circuit 905 may receive and send RF signals, which are also called electromagnetic signals, the RF circuit 905 may convert electrical signals into electromagnetic signals or convert electromagnetic signals into electrical signals, and communicate with communication networks and other devices through the electromagnetic signals. The RF circuit 905 may include a known circuit for executing the above functions, wherein the known circuit may include but not limit to an antenna system, an RF transceiver, one or more amplifiers, a tuner, one or more oscillators, a digital signal processor, a chipset of coder-decoder, a subscriber identity module (SIM), and the like.

The audio-frequency circuit 906 may receive audio-frequency data from the peripheral interface 903, and convert the audio-frequency data into electrical signals, which may be sent to the loudspeaker 911.

The loudspeaker 911 may reconvert the audio signals received from the wireless network through the RF circuit of the mobile phone into the sound, and play the sound to the user.

The power management chip 908 may supply power to hardware connected through the CPU 902, the I/O subsystem and the peripheral interface, and perform power management.

The apparatus for image processing, the storage medium, and the electronic device provided by the above-mentioned embodiments may execute the method for image processing provide by any of the embodiments, and have corresponding functional modules to execute the methods and achieve the beneficial effects. Technical details that are not detailed described in the above embodiment may refer to the method for image processing described in any of the embodiments.

To be noted that, the above may only be a preferred embodiment and application of the technical principles of the present disclosure. Those skilled in the art should understand, the present disclosure may not be limited to the specific embodiments herein, any obvious transformation, readjustment and replacement should not depart from the scope of the present disclosure. Therefore, although the present disclosure may be described in details through the above embodiments, the present disclosure should not be limited to the above embodiments. Without departing from the conception of the present disclosure, more of other equivalent embodiments may be included in the present disclosure, and the scope of the present disclosure should be defined by the scope of the claims.

What is claimed is:

1. A method of image processing, comprising:
    obtaining an image in a chrominance-luminance separated color mode;
    traversing luminance components of all pixels in the image to determine a number of pixels corresponding to the respective luminance component;
    generating an original luminance distribution of the image based on the luminance components and the number of the pixels corresponding to the respective luminance component;
    generating a luminance mapping relationship between a preset standard luminance distribution and the original luminance distribution; and adjusting the luminance components of the pixels in the image based on the luminance mapping relationship to obtain a processed image;

wherein the preset standard luminance distribution comprises a plurality of first ratios, and each first ratio indicates a ratio of a number of pixels corresponding to one target luminance component to a total number of pixels in the image;

wherein the original luminance distribution of the image comprises a plurality of second ratios, and each second ratio indicates a ratio of a number of pixels corresponding to one luminance component to a total number of pixels in the image; and wherein generating the luminance mapping relationship comprises:

determining luminance components to be adjusted in the original luminance distribution of the image and corresponding target luminance components in the preset standard luminance distribution based on the first ratios and the second ratios; and creating the luminance mapping relationship between the luminance components to be adjusted and the corresponding target luminance components.

2. The method according to claim 1, wherein a previous luminance component in the original luminance distribution has one second ratio less than one first ratio of one corresponding target luminance component in the preset standard luminance distribution; and one or more subsequent luminance component in the original luminance distribution is determined to be adjusted such that a mapping between the corresponding target luminance component and the one or more subsequent luminance component is created, wherein the one or more subsequent luminance component is located in an interval adjacent to the previous luminance component.

3. The method according to claim 2, wherein the one or more subsequent luminance component comprises a first luminance component having one second ratio equal to or greater than a difference between the second ratio of the previous luminance component and the first ratio of the corresponding target luminance component, and the first luminance component is determined to be adjusted.

4. The method according to claim 2, wherein the one or more subsequent luminance component comprises a first luminance component and a second luminance component having one second ratio respectively, and a sum of the second ratios of the first luminance component and the second luminance component is equal to or greater than a difference between the second ratio of the previous luminance component and the first ratio of the corresponding target luminance component, and the first luminance component and the second luminance component are determined to be adjusted.

5. The method according to claim 4, wherein a previous luminance component interval in the original luminance distribution has one fourth ratio less than one third ratio of corresponding luminance component interval in the preset standard luminance distribution; and a subsequent luminance component interval in the original luminance distribution is determined to be adjusted such that a mapping between luminance components in the subsequent luminance component interval and the corresponding target luminance component is created, wherein the subsequent luminance component interval is adjacent to the previous luminance component interval and has one fourth ratio equal to or greater than a difference between the fourth ratio of the previous luminance component interval and the third ratio of the corresponding luminance component interval.

6. The method according to claim 1, wherein the luminance components are divided into a plurality of luminance component intervals;

the preset standard luminance distribution comprises a plurality of third ratios, and each third ratio indicates a ratio of a number of pixels corresponding to one luminance component interval to a total number of pixels;

the original luminance distribution of the image comprises a plurality of fourth ratios, and each fourth ratio indicates a ratio of a number of pixels corresponding to one luminance component interval to a total number of pixels in the image; and the generating the luminance mapping relationship comprises:

determining luminance components to be adjusted in the original luminance distribution of the image and corresponding target luminance components in the preset standard luminance distribution based on the third ratios and the fourth ratios; and creating the luminance mapping relationship between the luminance components to be adjusted and the corresponding target luminance components.

7. The method according to claim 1, wherein generating the luminance mapping relationship comprises:

determining a range of luminance components of the image, wherein the range of luminance components of the image is a subset of a range of luminance components in the preset standard luminance distribution;

obtaining target luminance distribution corresponding to the range of luminance components of the image from the preset standard luminance distribution; and generating the luminance mapping relationship between the target luminance distribution and the original luminance distribution of the image.

8. The method according to claim 1, wherein the image comprises a dark region, and luminance components of the pixels in the dark region have values smaller than a preset value; and the method further comprises:

after generating the luminance mapping relationship, determining a ratio of a number of pixels in the dark region of the image to a total number of pixels of the image; and adjusting the luminance mapping relationship based on the ratio of the number of pixels in the dark region to the total number of pixels of the image and the luminance components of the pixels in the dark region.

9. The method according to claim 8, wherein adjusting the luminance mapping relationship comprises:

determining an adjust value for the luminance components of the dark region based on the ratio of the number of pixels in the dark region to the total number of pixels in the image; and subtracting the adjust value from corresponding target luminance components corresponding to the luminance components in the dark region to obtain the adjusted luminance mapping relationship.

10. The method according to claim 9, wherein the adjust value for the luminance components in the dark region is negatively correlated with the ratio of the number of pixels in the dark region to the total number of pixels in the image.

11. The method according to claim 1, wherein the chrominance-luminance separated color mode comprises a YUV color mode and a LAB color mode.

12. The method according to claim 11, wherein obtaining the image in the YUV color mode comprises:
   converting raw signals captured by an image sensor into an image in the RGB color mode; and
   generating an image in the YUV color mode based on the image in the RGB color mode.

13. The method according to claim 1, wherein the preset standard luminance distribution is configured for a scene mode.

14. An electronic device comprising a non-transitory memory storing a computer program and a processor, wherein the processor is configured to execute the computer program to:
   obtain an image in a chrominance-luminance separated color mode;
   traverse luminance components of all pixels in the image to obtain a number of pixels corresponding to the respective luminance component and generate an original luminance distribution of the image;
   generate a mapping relationship between a preset standard luminance distribution and the original luminance distribution of the image, wherein the original luminance distribution comprises a plurality of original luminance components, the preset standard luminance distribution comprises a plurality of target luminance component, and one or more original luminance component in the original luminance distribution is mapped to one target luminance component; and
   adjust the one or more original luminance component mapped to the respective target luminance component to be the respective target luminance component such that a processed image is obtained;
   wherein the preset standard luminance distribution comprises a plurality of first ratios, and each first ratio indicates a ratio of a number of pixels corresponding to one target luminance component to a total number of pixels in the image;
   wherein the original luminance distribution of the image comprises a plurality of second ratios, and each second ratio indicates a ratio of a number of pixels corresponding to one luminance component to a total number of pixels in the image; and
   wherein while generating the luminance mapping relationship, the processor is further configured to execute the computer program to:
      determine luminance components to be adjusted in the original luminance distribution of the image and corresponding target luminance components in the preset standard luminance distribution based on the first ratios and the second ratios; and
      create the luminance mapping relationship between the luminance components to be adjusted and the corresponding target luminance components.

15. The electronic device according to claim 14, wherein the chrominance-luminance separated color mode comprises YUV color mode and LAB color mode.

16. The electronic device according to claim 14, further comprising:
   an image sensor configured to capturing raw signals, wherein the raw signals are converted into an image in the RGB color mode, and the image in the YUV color mode is generated based on the image in the RGB color mode.

17. The electronic device according to claim 14, wherein the one or more original luminance component comprises a second original luminance component, wherein the second original luminance component has one second ratio equal to or greater than a difference between the second ratio of the second original luminance component and the first ratio of one corresponding target luminance component in the preset standard luminance distribution.

18. A non-transitory computer readable medium storing instructions which, when executed by a processor, cause the processor to:
   obtain an image in a chrominance-luminance separated color mode;
   traverse luminance components of all pixels in the image to obtain a number of pixels corresponding to the respective luminance component and generate an original luminance distribution of the image;
   generate a mapping relationship between a preset standard luminance distribution and the original luminance distribution of the image, wherein the original luminance distribution comprises a plurality of original luminance components, the preset standard luminance distribution comprises a plurality of target luminance component, and one or more original luminance component in the original luminance distribution is mapped to one target luminance component; and
   adjust the one or more original luminance component mapped to the respective target luminance component to be the respective target luminance component such that a processed image is obtained;
   wherein the preset standard luminance distribution comprises a plurality of first ratios, and each first ratio indicates a ratio of a number of pixels corresponding to one target luminance component to a total number of pixels in the image;
   wherein the original luminance distribution of the image comprises a plurality of second ratios, and each second ratio indicates a ratio of a number of pixels corresponding to one luminance component to a total number of pixels in the image; and
   wherein while generating the luminance mapping relationship, the instructions are further executed to cause the processor to:
      determine luminance components to be adjusted in the original luminance distribution of the image and corresponding target luminance components in the preset standard luminance distribution based on the first ratios and the second ratios; and
      create the luminance mapping relationship between the luminance components to be adjusted and the corresponding target luminance components.

* * * * *